United States Patent [19]
Sutherland et al.

[11] 3,808,783
[45] May 7, 1974

[54] SOYBEAN HARVESTING HEADER

[75] Inventors: Gail Russell Sutherland; Ronald Keith Leonard; Joe Henry Hoeksema, all of Des Moines, Iowa

[73] Assignee: Deere & Company, Moline, Ill.

[22] Filed: June 7, 1972

[21] Appl. No.: 260,503

[52] U.S. Cl. .................................... 56/106, 171/61
[51] Int. Cl. ............................................ A01d 45/02
[58] Field of Search....... 56/14.3, 14.5, 98, 103–106, 56/108, 111, 112, 117, 119, 2; 171/61, 62

[56] References Cited
UNITED STATES PATENTS

| | | | |
|---|---|---|---|
| 3,520,121 | 7/1970 | Ashton et al. | 56/106 |
| 3,201,928 | 8/1965 | Claas | 56/98 |
| 3,350,865 | 11/1967 | Ashton et al. | 56/119 |
| 2,862,345 | 12/1958 | Wigham | 56/98 |
| 2,279,183 | 4/1942 | Stimatze | 56/98 |
| 1,390,159 | 9/1921 | Price | 56/106 X |
| 2,783,603 | 3/1957 | Smith et al. | 56/119 |
| 3,339,354 | 9/1967 | Kessler | 171/61 X |
| 3,388,538 | 6/1968 | Markham | 56/119 X |
| 2,855,058 | 10/1958 | Krier et al. | 171/61 X |

Primary Examiner—Louis G. Mancene
Assistant Examiner—J. A. Oliff

[57] ABSTRACT

A conventional self-propelled combine has a forwardly extending feederhouse with a forward intake end and a crop feeding conveyor for moving crops from the intake end to the separating mechanism in the combine. A row crop header is mounted on the front of the feeder housing and includes a transversely extending platform with a plurality of harvesting units extending forwardly therefrom at transversely spaced intervals. Each harvesting unit includes a pair of belt-like gathering elements respectively disposed on the opposite sides of a passageway, the gathering elements having cooperative, loop-like, flexible portions, which mesh with each other to grasp the soybean plants and move them rearwardly along the passageway after the stalks have been severed by a rotary knife disposed below the forward ends of the gathering elements. The gathering elements move the severed plants rearwardly to a transverse auger on the platform, which converges the crop and delivers it to the intake end of the feeder housing. The individual row units are laterally adjustable to accommodate different row spacings, and independently float on the ground so that the respective knives are maintained close to the ground.

27 Claims, 5 Drawing Figures

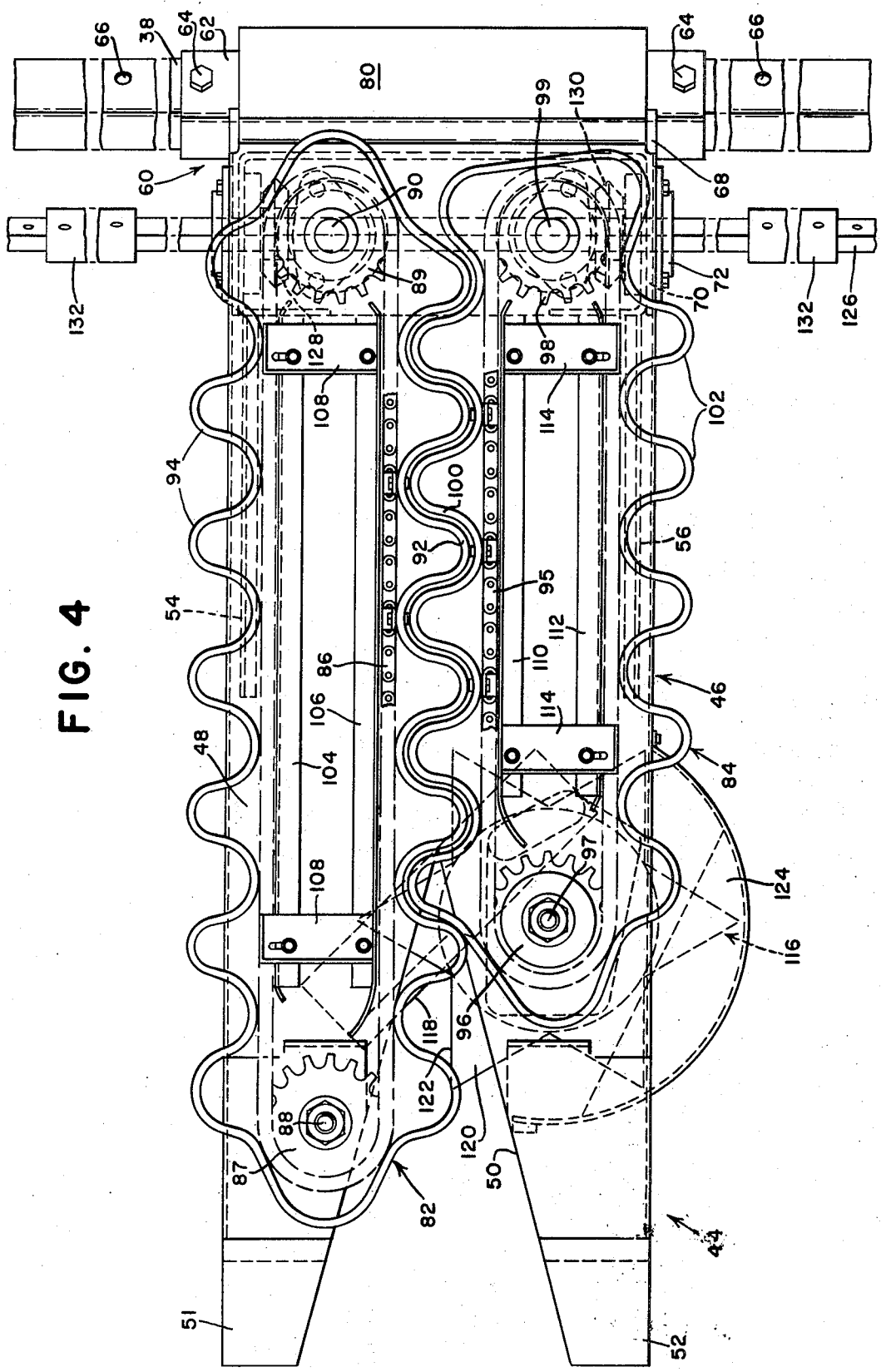

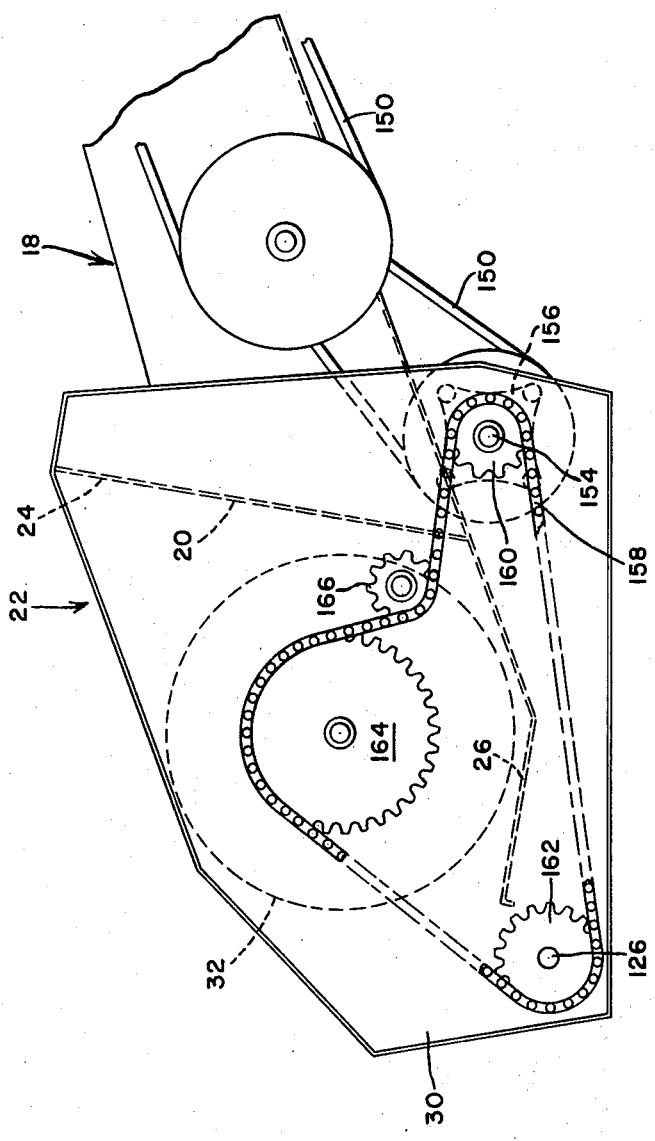

SOYBEAN HARVESTING HEADER

BACKGROUND OF THE INVENTION

This invention relates to a harvesting header for a combine having particular utility in harvesting soybeans or the like.

Soybeans and other row planted grain crops, such as maize, are conventionally harvested by a combine equipped with a cutting platform, which has a transverse cutterbar on the leading edge of the platform and a reel, which combs the crop into the cutterbar, the severed crop moving rearwardly to a transverse auger, which converges the crop and feeds it through the inlet end of the combine feeder housing.

Soybean harvesting losses have long presented a problem and have generally averaged much higher than harvesting losses in corn or small grain, which are also harvested by means of combines. A large part of the soybean harvesting losses occurs during the gathering of the plants into the machine. Some of the gathering losses are the result of the pods shattering during the gathering process with the beans dropping onto the ground, either as a result of contact with the reel, or agitation by the reciprocating cutterbar during the cutting process. The remaining gathering loss is the result of pods left in the field on lodged or clipped-off branches or on the stubble below the point where the plant is severed. Thus, the losses are a result of the nature of the soybean plant, wherein the pods at the time of harvest are susceptible to shattering and many of the pods hang very close to the ground.

Of course, the harvesting losses represent a substantial decrease in profit, and therefore efforts have been made to reduce the harvesting losses. In some instances, the efforts have been directed at keeping the cutterbar as close to the ground as possible. However, with the newer, larger capacity combines, the cutting platform widths have increased, making it increasingly difficult for the platform to closely follow the ground. Attempts have also been made to provide individual row units for gathering the crop into the combine, the individual row units closely following the contour of the ground, although, to date, such row units have not been widely utilized.

SUMMARY OF THE INVENTION

According to the present invention, there is provided an improved harvesting header having a plurality of harvesting units respectively operative to remove separate rows of plants such as soybeans, maize, or the like from the field.

An important feature of the invention resides in the fact that the individual row units are mounted for independent vertical adjustment about a transverse pivot and have part of their weight supported on the ground, so that each row unit independently follows the contour of the ground.

Another feature of the invention resides in the fact that the individual row units are laterally adjustable on the harvesting platform to accommodate different row spacings. Also, means are provided in the drive system for the row units for accommodating the lateral shifting of the row units.

Another feature of the invention resides in the use of a pair of endless flexible gathering elements in each row unit, the gathering elements having fore-and-aft extending opposite inner runs along opposite sides of a fore-and-aft passageway, the plants being clasped between the opposite belt runs and moved rearwardly along the passageway to the harvesting platform. More specifically, the endless flexible gathering elements include flexible, loop-like portions which mesh with each other in the fore-and-aft passageway to grip the plants therebetween, the relatively gentle gripping action between the flexible portions reducing the shatter loss when the plants are gathered into the machine.

Another feature of the invention resides in the provision of a rotary-type cutting element below the gathering elements for severing the plant close the ground, the rotary cutting element reducing the shatter loss while the plants are severed from the field.

Also according to the invention, the rotary cutting element is driven off the front sprocket for one of the gathering elements to provide a simple and economic drive for the cutting element.

Still another feature of the invention resides in the rearward offset of the forward end of one of the gathering elements from the forward end of the other gathering element, the cutting element being disposed below the front end of the rearward gathering element so that the cutting action occurs at approximately the same time the plant is clasped between the meshing gathering elements.

Still another feature of the invention resides in the simple, rugged, and economic construction of the individual row units.

BRIEF DESCRIPTION OF THE DRAWINGS

FIG. 4 is a top plan view of one of the harvesting units, with the sheet metal portions removed to more clearly disclose the operating mechanisms.

FIG. 5 is a side view of the harvesting platform and the forward end of the combine feeder housing, with the side panel of the platform and the harvesting units removed to illustrate the drive system for the header.

DESCRIPTION OF THE PREFERRED EMBODIMENT

The invention is embodied in a self-propelled combine having a main separator body, indicated generally by the numeral 10 and supported on a pair of forward drive wheels 12 and steerable rear wheels (not shown). The main body has an elevated operator's station 14 at its forward end and a grain tank 16 behind the operator's station, only the lower portion of the operator's station and grain tank being shown in FIG. 1.

Figure 1:
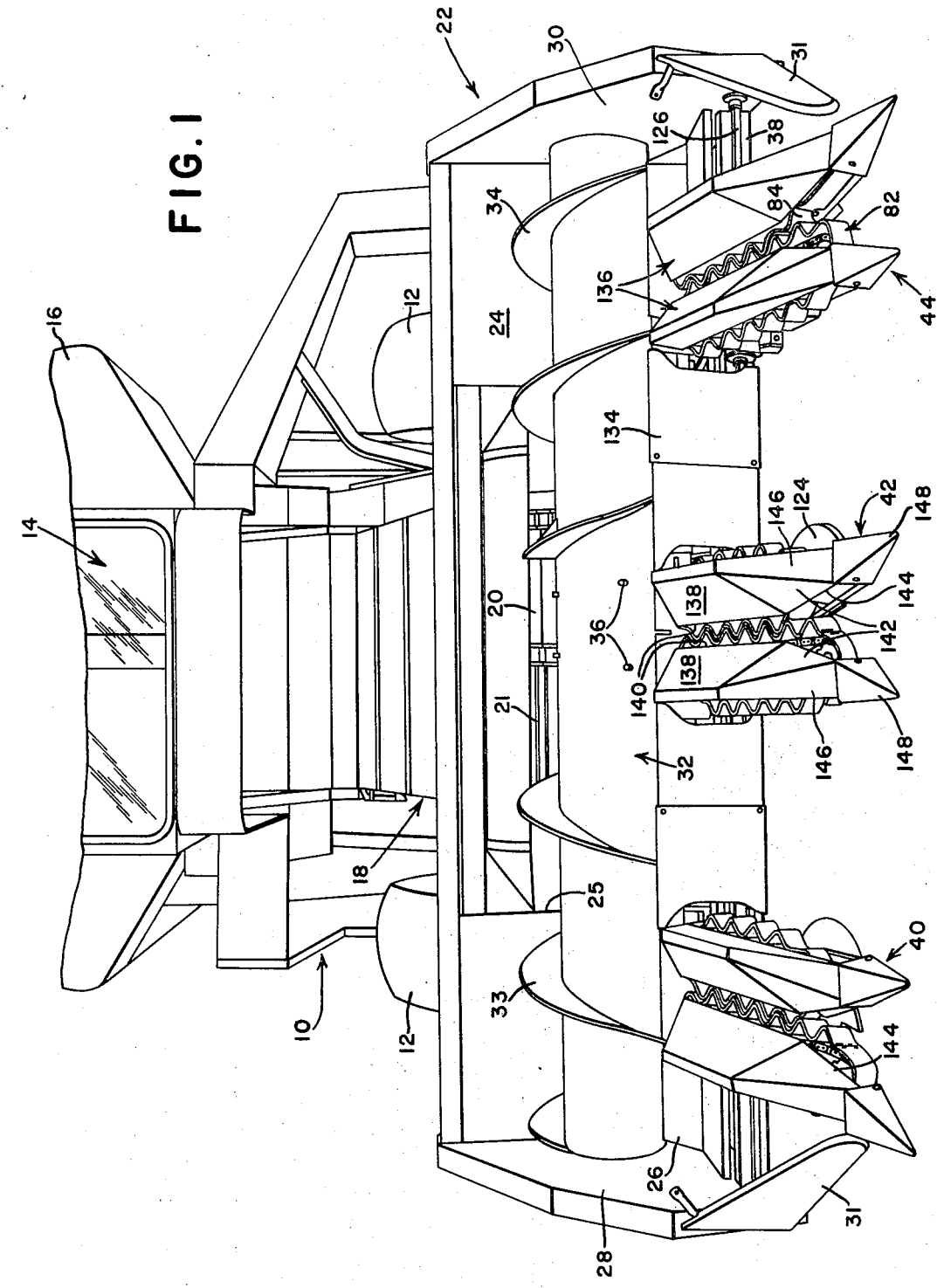
FIG. 1 is a front perspective view of a combine having the improved harvesting header mounted thereon, the upper portion of the combine being omitted.
Figure 2:
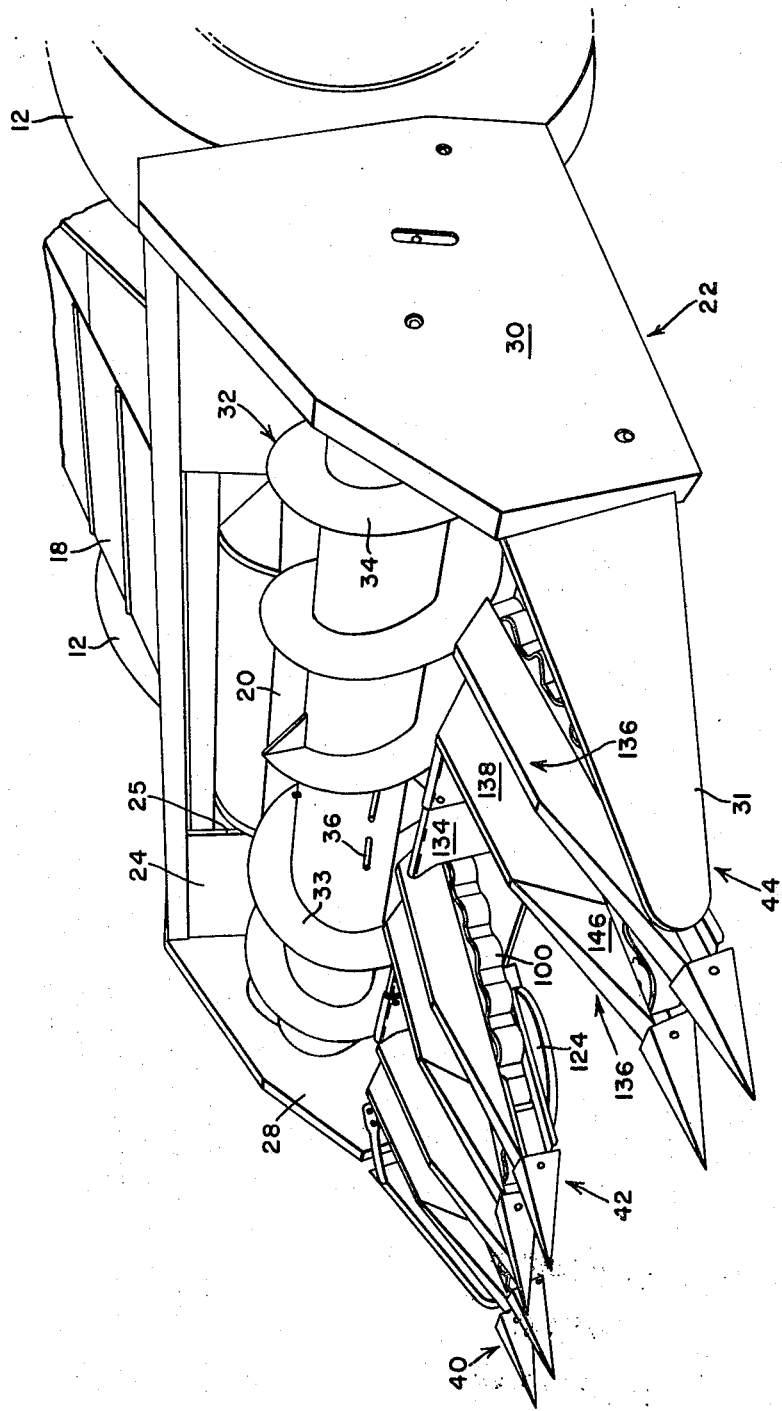
FIG. 2 is a left front perspective view of the harvesting header, with the center harvesting unit swung upwardly to illustrate the independent floating action of the respective units.
Figure 3:
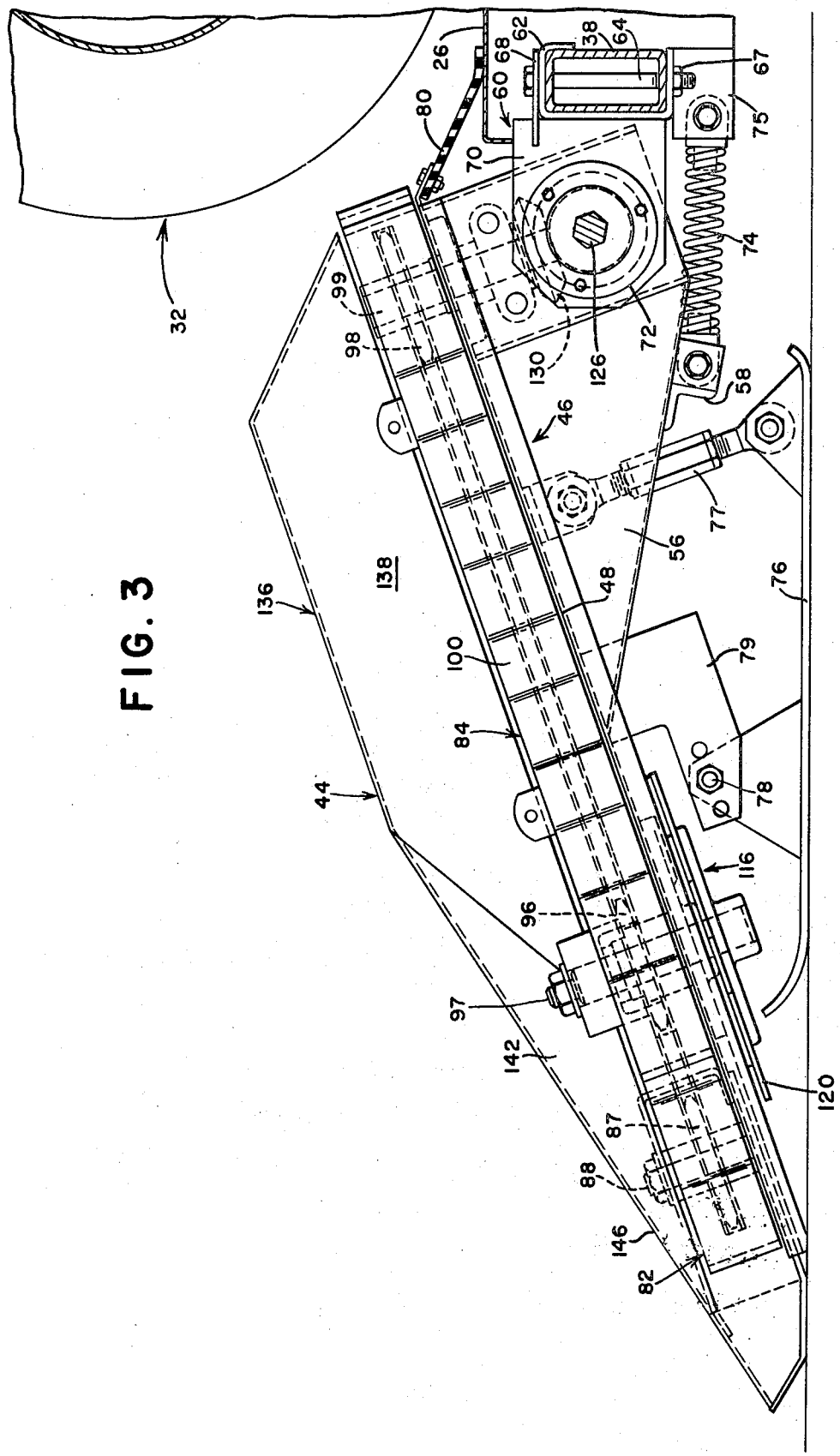
FIG. 3 is a side elevation view of one of the harvesting units, with portions of the unit omitted to more clearly illustrate the invention.

As is conventional, the separator body has a forward crop inlet opening communicating with a downwardly and forwardly inclined feeder housing 18, which extends forwardly from the main body 10 below the operator's station. As is conventional, the feeder housing has a generally rectangular crop intake opening 20 at its forward end, and a chain-and-slat-type conveyor 21 is mounted in the feeder housing and moves the crop from the intake opening 20 along the floor of the feeder housing to the crop inlet in the main body. Only a small portion of the conveyor 21 is shown in FIG. 1, the above construction all being more-or-less conventional.

A transversely elongated platform 22 is removably mounted on the forward end of the feeder housing 18 and the platform 22 includes a generally upright rear wall 24 having an outlet opening 25, which registers with the forward intake opening 20 of the feeder housing. A bottom or floor 26 extends forwardly from the rear wall 24, and the platform is also provided with right and left side walls 28 and 30 at opposite ends of the platform. A pair of deflectors 31 extend forwardly from the side walls 28 and 30 to deflect the crops growing in rows not being harvested around the platform side walls. A transverse auger 32 extends between the opposite side walls and includes oppositely wound flights 33 and 34 extending inwardly from its opposite ends. As is conventional, the auger is rotated so that the flights converge the crop inwardly along the floor to the center of the platform, where disappearing-type fingers 36 engage the crop and propel it rearwardly to the feeder housing conveyor 21.

A transverse box-type beam 38 spans the width of the platform below the forward end of the floor 26, and three separate row harvesting units, indicated in their entirety by the numerals 40, 42, and 44, are mounted on the beam 38 at transversely spaced intervals. The row harvesting units 40, 42, and 44 are identical, and therefore only one unit will be described in detail.

The row harvesting unit includes a fore-and-aft extending frame, indicated in its entirety by the numeral 46, the frame chiefly being formed by a generally horizontal, somewhat forwardly and downwardly inclined rigid plate 48 having a large V-shaped indentation 50 at its forward end, so that the front of the plate has right and left, forwardly extending diverging arms 51 and 52. A pair of brackets 54 and 56 depend from the opposite sides of the plate 48 adjacent its rearward end and are connected by a transverse cross member 58, which extends between the bottom edges of the brackets.

The frame 46 is mounted on the platform beam 48 by a mounting means, indicated in its entirety by the numeral 60. The mounting means 60 includes a channel-shaped mounting member 62 which is mounted in telescoping fashion on the beam 38. The member 62 is attachable to the beam 38 at alternate lateral locations by means of a pair of bolts 64 which extend downwardly through holes in the mounting member 62 and through alternate holes 66 in the beam 38. The member 62 can be laterally adjusted by removing the bolt 64, laterally sliding the member 62 along the beam 38 until the holes in the mounting member are aligned with a new set of holes 66 in the beam 38, and then reinserting the bolts 64, which are retained by nuts 67. A horizontal plate 68 extends rearwardly from the top of the mounting member 62, and a pair of upright brackets 70 extend forwardly from the plate 68 and the rearward side of the member 62 respectively adjacent to the brackets 54 and 56. An annular, transverse pivot 72 connects the brackets 70 to the respective brackets 54 and 56, so that the frame 46 is vertically swingable about the axis of the pivots 72. A helical compression spring 74 extends between the cross members 58 and a bracket 75 depending from the member 62 to partly counterbalance the weight of the row unit.

The row unit is provided with a skid shoe 76, which has its rearward end connected to the underside of the plate 48 by an adjustable link 77 and its forward end connected to a pivot 78 carried by a bracket 79 depending from the underside of the plate 48. The skid shoe is centrally located on the row unit, so that the shoe rides on top of the row. Thus, the row unit rides on the ground and is free to float vertically about the pivots 72, so that it follows the contour of the ground, the spring 74 partly counterbalancing the weight of the unit to improve the floating action. A rubber flap 80 is attached to and extends rearwardly from a rearward end of the plate 48. The rearward end of the flap engages the floor 26 of the platform to seal the gap between the platform and the plate, the flexibility of the flap permitting the vertical adjustment of the row unit.

A pair of endless flexible gathering elements 82 and 84 are disposed immediately above the plate 48 and have opposite rearwardly moving inner runs, which extend rearwardly from the V-shaped indentation 50 in the plate to the rearward end of the plate. The right-hand gathering element 82 includes a chain 86 trained around a front sprocket 87, which is parallel to the plate 48 and mounted on a shaft 88 journaled in and extending upwardly from the plate, and a rear sprocket 89, which is mounted on a shaft 90 journaled in and extending downwardly through the plate 48. Attached at equal intervals to the chain is a rubber belt 92, which forms a flexible portion or loop between each attaching point to the chain. The left-hand gathering element 84 similarly includes a chain 95 trained around a front sprocket 96, which is mounted on a shaft 97 journaled in and extending downwardly through the plate 48, and a rear sprocket 98, which is mounted on a shaft 99 extending downwardly through the plate 48 similar to the shaft 90. A rubber belt 100 is similarly attached to the chain 95 at equal intervals and forms a plurality of loops 102 between the attaching points. The construction and function of the gathering elements is substantially the same as described in U.S. Pat. No. 3,339,354, also assigned to the assignee herein.

As is apparent, the belts flatten out as the chain moves around the front sprockets, and the generally sinusoidal loops 102 and 94 mesh after the gathering elements have moved around the front sprockets to clasp the plants therebetween, the gathering elements moving the plants rearwardly along the top surface of the plate 48 and discharging them rearwardly onto the floor of the platform as the gathering elements move around the rear sprockets 89 and 98. The lower edge of the belts 92 and 100 ride along the top of the plate 48 to drag loose material rearwardly along the plate. It is also apparent, that the right front sprocket 57 is disposed forwardly of the left front sprocket 96, so that the right belt 92 generally engages the plants first.

The opposite runs of the chain 86 move along a pair of angle irons 104 and 106, which are mounted on top of the plate 48 and connected by a pair of cross members 108, the outer angle iron 104 being laterally adjustable to adjust the chain tension. Similarly, the opposite runs of the left chain 95 run along a pair of angle irons 110 and 112, which are interconnected by a cross member 114 so that the outer angle iron 112 can be laterally adjusted to adjust the tension on the chain 95.

A cutting means, indicated generally by the numeral 116, is mounted immediately below the plate 48 adjacent to the rearward end of the V-shaped indentation 50. The cutting means 116 includes a stationary knife or shear bar 118, which extends at an angle forwardly and to the right across the indentation 50, and a star-shaped rotary cutting element 120, which is coaxially connected to and driven by the lower end of the shaft 97 in a clockwise direction, as seen in FIG. 4. Each projection of the cutting element is provided with a cutting edge 122 along its leading edge, which registers with the stationary knife 118 to cut the plants as the machine advances, before the plants reach the end of the indentation 50. A semi-circular shield 124 is mounted on the plate 48 and extends to the left therefrom to shield the portion of the rotary cutting element 120 that extends beyond the plate. While only a single rotary cutting element is shown for each row unit, it is to be understood that the shear bar could be replaced with a secondary rotary cutting element which registers with the first cutting element.

The driven elements of the row unit are driven by a transverse drive shaft 126, which has a hexagonal cross section and extends coaxially through the pivots 72. The drive shaft 126 drives the right rear sprocket shaft 90 through a bevel gear set 128 and similarly drives the left rear sprocket shaft 99 through a bevel gear set 130. Thus, the two rear sprockets 89 and 98 act as drive sprockets for the gathering elements, and the cutting means 116 is driven by the left-hand chain 95. The drive shaft 126 is provided with telescoping portions 132 between the adjacent row units and between the end row units and the end of the platform, to accommodate the lateral adjustment of the row units for different row spacings.

As shown in FIG. 1, upright transverse shields 134 are provided between the adjacent row units immediately in front of the drive shaft, the shields 134 being provided in the two overlapping sections, which can be connected at different locations to accommodate the different spacings between the row units.

A pair of sheet metal shields 136 are respectively mounted on the row unit above the gathering elements 82 and 84. Each shield includes a downwardly and inwardly inclined inner wall 138 terminating in a fore-and-aft edge 140 immediately above the respective inner runs of the gathering elements. The inclined inner walls 138 have diverging front portions 142, which have lower edges generally above the diverging edges of the V-shaped indentation 50 of the plate 48. The walls 142 emerge into upwardly and rearwardly inclined front walls 146, and a pair of conventional, vertically swingable, floating gathering points 148 extend forwardly from the front walls 146. As is apparent, the shields 136 and the converging edges of the indentation 50 form a converging forward end for a fore-and-aft passageway, the rearward portion of which is defined by the lower edges 140 of the shields and the angle irons 106 and 110, the inner runs of the gathering elements moving rearwardly along opposite sides of the rearward portion of the passageway. As is also apparent, the bottom of the passageway to the rear of the knife means 116 is closed by the plate 48.

The drive shaft 126 is driven from the combine through a drive system which is shown in FIG. 5. The drive system includes a drive 150 on the left-hand side of the feeder housing 18, which in turn drives a belt drive 152, which drives a transverse drive shaft 154 adjacent to the lower rear wall of the platform. All of the above, represents more-or-less conventional drive construction for a combine header. As is also well known, the drive shaft 154 is provided with a separable coupler 156, which breaks the drive when the platform is removed from the feeder housing, alternate platforms being provided with a coupler element that mates with the coupler element remaining with the combine.

The transverse drive shaft 154 drives a chain drive on the left-hand side of the platform, which includes a chain 158 trained around a sprocket 160 on the end of the drive shaft 154, a driven sprocket 162 on the end of the drive shaft 126, a second driven sprocket 164 on the auger shaft, and an idler sprocket 166. The left side wall 30 of the platform is a double wall, and the chain drive is disposed between the two wall panels to fully shield the drive. While the drive shaft 126 has been described as extending the width of the platform, the shaft could only extend halfway across the platform to drive the units on the left side of the machine, while a similar drive is provided on the right side of the platform. The use of separate drives is more desirable for wider platforms, and when two different drives are utilized, a lesser amount of compensation is required in the drive shaft to accommodate the lateral adjustment of the row units.

In operation, the row units are adjusted so that their spacing conforms to the spacing between the plant rows, and the machine is driven with the row units centered on the rows. As previously described, the skid shoe 76 rides on top of the row and the individual row units are free to float about the axis of the drive shaft 126 independently of one another, so that they follow the contour of the ground. The skid shoe is adjusted so that the cutting means operates as close to the ground as possible. As the machine advances, the gathering point 148 lifts any downed or lodged crop and the shields 136 converge the plants as the machine advances. The plants are then clamped between the meshing gathering elements 82 and 84, and at approximately the same time that they are initially clamped by the gathering elements, they are severed from the ground. The gathering elements move the plants rearwardly, dragging any material that has been shattered loose from the plants along the plate 48. The crop material is then discharged beneath the auger 32, which converges the crop and feeds it rearwardly to the feeder housing 21. Since the individual units follow the contour of the ground as close as possible, a very short stubble is left in the field, reducing the amount of soybeans left below the cutter when the header is used in soybeans. Also, the individual gathering elements lift the downed and tangled plant portions so that the cutting mechanism does not pass over them. The gathering elements gently handle the plants and convey a substantial portion of the crop shattered loose during the cutting process to the platform auger, thereby reducing the shatter loss at the cutterhead.

We claim:

1. In a harvester having a body adapted to advance over a field of row planted crops and having a forward crop inlet and crop feeding means adapted to move crops rearwardly from the inlet, the improvement comprising: a platform mounted on the body forwardly of the crop feeding means; a plurality of transversely spaced row units mounted on the platform, each row unit being provided with a fore-and-aft elongated passageway, a pair of endless flexible gathering elements respectively having opposite fore-and-aft extending rearwardly moving inner runs along at least a portion of the passageway and adapted to grasp the standing crop growing in a row between the opposite gathering element runs, a cutting means generally adjacent and below the forward ends of the gathering elements for severing the crop close to the ground after the crop has been engaged by at least one of the gathering elements, each row unit including a transverse pivot means operatively connected to the platform adjacent the rearward end of the row unit to permit independent vertical floating adjustment of the forward ends of the respective row units about said pivot means, each row unit having part of its weight supported on the ground so that the respective units independently follow the contour of the ground; a transverse auger-type conveyor means on the platorm immediately to the rear of and in crop-receiving relationship with the rearward ends of the gathering elements for the row units and operative to converge the crop and deliver it to the crop feeding means; and drive means for driving the conveyor means, the cutting means, and the gathering elements.

2. The invention defined in claim 1 and including spring means operative between each row unit and the platform for partly counterbalancing the weight of the row unit.

3. The invention defined in claim 1 wherein the platform includes a transverse beam and the row units are selectively mountable on the beam at different locations to vary the spacing between the row units.

4. The invention defined in claim 3 wherein the drive means includes a transverse drive shaft means coaxial with the pivot means, the drive shaft means including means for selectively adjusting the length of the drive shaft means between adjacent row units to accommodate different lateral spacings between the row units.

5. The invention defined in claim 1 wherein each cutting means includes a stationary blade intersecting the passageway below the gathering elements and a rotary cutting element having a plurality of cutting edges successively registering with the stationary blade as the cutting element rotates to sever the crop therebetween.

6. The invention defined in claim 5 wherein the gathering elements for each row unit include a pair of chains, one of said chains being trained around a front and a rear sprocket, the rotary cutting element of each row unit being connected to and driven by said front sprocket.

7. The invention defined in claim 1 wherein each endless flexible gathering element includes a drive chain trained around a front and a rear sprocket, the front sprocket for one of the gathering elements in each pair of gathering elements being offset rearwardly from the front sprocket for the other gathering element so that the inner run of said other gathering element extends forwardly of the inner run of said one gathering element.

8. The invention defined in claim 7 wherein the drive means includes a transverse drive shaft and a pair of bevel gear drives respectively drivingly connecting the drive shaft to the rear sprockets of the gathering elements.

9. In a harvester having a mobile main body adapted to advance over a field of row planted crops and having a forward crop intake opening, the improvement comprising: a forward, transversely elongated platform carried by the main body and including a plurality of transverse pivot means adjacent the forward end of the platform; a plurality of transversely spaced row crop harvesting units respectively mounted on the pivot means for independent vertical adjustment of the harvesting units about said pivot means, each harvesting unit having part of its weight supported on the ground so that the respective units independently follow the contour of the ground and including a fore-and-aft elongated passageway, a pair of endless flexible gathering elements respectively disposed on opposite sides of the passageway and having rearwardly moving inner runs adapted to engage the standing crop growing in a row and move it rearwardly, and a cutting means generally below the forward end of the gathering elements for severing the crop close to the ground; a conveyor means mounted on the platform in a crop-receiving relationship with the gathering elements for receiving the severed crop from the gathering elements and delivering it through the crop intake opening; and drive means for driving the gathering elements, the cutting means, and the conveyor means.

10. The invention defined in claim 9 and including spring means operative between the platform and each row harvesting unit to partly counterbalance the weight of the respective units supported on the ground.

11. The invention defined in claim 9 wherein each row harvesting unit includes skid means adapted to engage the ground and to support part of the weight of the row unit on the ground.

12. The invention defined in claim 11 wherein the skid means includes adjustment means for selectively varying the height that the knife means is supported above the ground to vary the cutting height of the crop.

13. In a harvester having a main body adapted to advance over the field of row planted crops and having a forward crop intake opening, the improvement comprising: a forward, transversely elongated harvesting platform carried by the main body; a plurality of transversely spaced row units mounted on the platform and extending forwardly therefrom, each row unit being provided with a fore-and-aft elongated passageway substantially parallel to the other row unit passageways, a pair of endless flexible gathering elements respectively having opposite fore-and-aft extending rearwardly moving inner runs along opposite sides of the passageway and having intermeshing projections adapted to clasp the standing crop growing in a row between the opposite gathering element runs, and a cutting means mounted on the frame below the gathering elements proximate to the initial intermeshment of the opposite gathering elements and operative to sever the crop below the gathering elements as it is clasped between the gathering elements; a transverse auger-type conveyor means in crop-receiving relationship with the rearward end of the gathering elements, the conveyor means converging the crop laterally on the platform and discharging the converged crop rearwardly through the crop intake opening in the main body; and drive means for driving the gathering elements, the cutting means and the conveyor means.

14. The invention defined in claim 13 wherein the forward end of one gathering element of each pair of gathering elements is offset forwardly of the forward end of the other gathering element.

15. The invention defined in claim 14 wherein each gathering element includes a chain trained around a front and a rear sprocket, each cutting means including a rotary cutting element coaxially attached to and driven by the front sprocket of the gathering element having its forward end offset to the rear of the other gathering element.

16. A harvester having a main body adapted to advance over a field of row planted crops having a forward crop inlet and crop feeding means adapted to move crops rearwardly from the inlet, the improvement comprising: a transversely elongated platform mounted on the forward end of the crop feeding means and including a transverse beam; a plurality of transversely spaced row units, each row unit being provided with a fore-and-aft elongated passageway, a pair of gathering means on opposite sides of the passageway for engaging the standing crop growing in a row and moving the crop rearwardly along the passageway, and a cutting means below the gathering means for severing the crop close to the ground; means for selectively mounting the respective row units at different locations on the transverse beam to selectively vary the spacing between adjacent row units, the mounting means including transverse pivot means connected to the beam end and to the row unit for permitting independent vertical floating adjustment of the respective row units about the pivot means; conveyor means on the platform in crop-receiving relationship with the row units for receiving the crop therefrom and delivering the crop to the intake end of the crop feeding means; and drive means for driving the gathering elements, the cutting means, and the conveyor means.

17. The invention defined in claim 16 wherein the drive means includes a transverse drive shaft means coaxial with the pivot means, the drive shaft means including means for selectively adjusting the length of the drive shaft means between adjacent row units to accommodate different lateral spacings between the row units.

18. The invention defined in claim 17 wherein the mounting means for each row unit includes a first mounting member selectively attachable to the beam at alternate locations, a second mounting member depending from the rearward end of the row unit, the pivot means pivotally interconnecting the first and second mounting members to permit vertical adjustment of the row units about the pivot means.

19. In a harvester having a main body adapted to advance over a field of row planted crops and having a forward crop inlet and crop feeding means adapted to move crops rearwardly from a forward intake end through the body inlet, the improvement comprising: a transversely elongated platform mounted on the forward end of the crop feeding means; a plurality of transversely spaced row units mounted on the platform, each row unit being provided with a fore-and-aft elongated passageway, a pair of endless flexible gathering elements respectively having opposite fore-and-aft extending rearwardly moving inner runs along the passageway adapted to clasp the standing crop growing in a row between the opposite gathering element runs, each gathering element including a drive chain trained around a front and a rear sprocket, the front sprocket for one of the gathering elements in each pair of gathering elements being offset rearwardly from the front sprocket for the other gathering element so that the inner run of said other gathering element extends forwardly of the inner run of said one gathering element, and a cutting means generally adjacent and below the forward ends of the gathering elements for severing the crop close to the ground, the gathering elements moving the severed crop rearwardly to a conveyor means in crop-receiving relationship with the gathering elements, the conveyor means being mounted on the platform and delivering the crop to the intake end of the crop feeding means; and drive means for driving the cutting means, the conveyor means, and the gathering elements.

20. The invention defined in claim 19 wherein the cutting means includes a stationary blade intersecting the passageway below the gathering elements and a rotary cutting element having a plurality of cutting edges successively registering with the stationary blade as the cutting element rotates to sever the crop therebetween.

21. The invention defined in claim 20 wherein the rotary cutting element of each cutting means is coaxially connected to and driven by the front sprocket for one of the gathering elements.

22. A row crop harvesting unit for a machine adapted to advance over a field of row planted crops comprising: a frame including a downwardly and forwardly inclined plate-like member having a pair of forward, rearwardly converging members adapted to receive standing plants therebetween; a cutting means mounted immediately below the plate-like member adjacent to the point of convergence of said converging members and operative to sever the plants close to the ground; and a pair of endless flexible gathering elements having opposite closely spaced, rearwardly moving inner runs immediately above the plate-like member with forward ends adjacent to the cutting means, the plants being clamped between the opposite inner runs of the gathering elements as they are being severed by the cutting means, so that the severed plants are moved rearwardly along the top of the plate-like member by the gathering elements.

23. The invention defined in claim 22 wherein the respective gathering elements include flexible projections which intermesh and clamp the plants therebetween along the inner runs of the gathering elements.

24. In a harvester having a mobile body adapted to advance over a field of row planted crops and having a forward crop intake opening, the improvement comprising: a platform mounted on the body forwardly of the intake opening; a plurality of transversely spaced row units mounted on and extending forwardly from the platform, each row unit including a fore-and-aft frame including a pair of forwardly extending arms, a pair of endless flexible gathering elements mounted above the frame and having opposite, fore-and-aft extending, rearwardly moving inner runs with intermeshing projections adapted to engage the crop standing in a row therebetween and move it rearwardly, a pair of front sprockets respectively mounted on the arms, a pair of rear sprockets mounted on the frame, each gathering element being trained around a front and a rear sprocket, and a cutting means mounted on the frame below the forward ends of the gathering elements proximate to the initial intermeshment of the opposite gathering elements and operative to sever the crop from the field as it is engaged by the gathering elements; and a transverse auger means mounted on the platform to the rear of and in crop-receiving relationship with the rearward discharge end of the gathering elements for each row unit for laterally converging the crop received from the row units and discharging it through the intake opening.

25. The invention defined in claim 24 wherein the arms of the row unit frames include generally horizontal, plate-like, forwardly diverging, coplanar members, the gathering elements being disposed adjacent the top surface of the members and the cutting means being disposed adjacent the bottom surface of said members.

26. The invention defined in claim 24 wherein each row unit includes transverse pivot means pivotally connecting the row unit frame to the platform so that each row unit is independently vertically swingable, each row unit being partially supported on the ground and independently floatable thereon to follow the contour of the ground.

27. The invention defined in claim 24 wherein the gathering element projections are flexible and deflect to grasp the crop between the opposite gathering elements.

* * * * *